Nov. 29, 1955 B. E. O'CONNOR ET AL 2,724,893
METHOD OF SEALING THE JOINT BETWEEN A COVER
AND A TURNED OVER CASING WALL FLANGE
Filed June 3, 1949 2 Sheets-Sheet 1
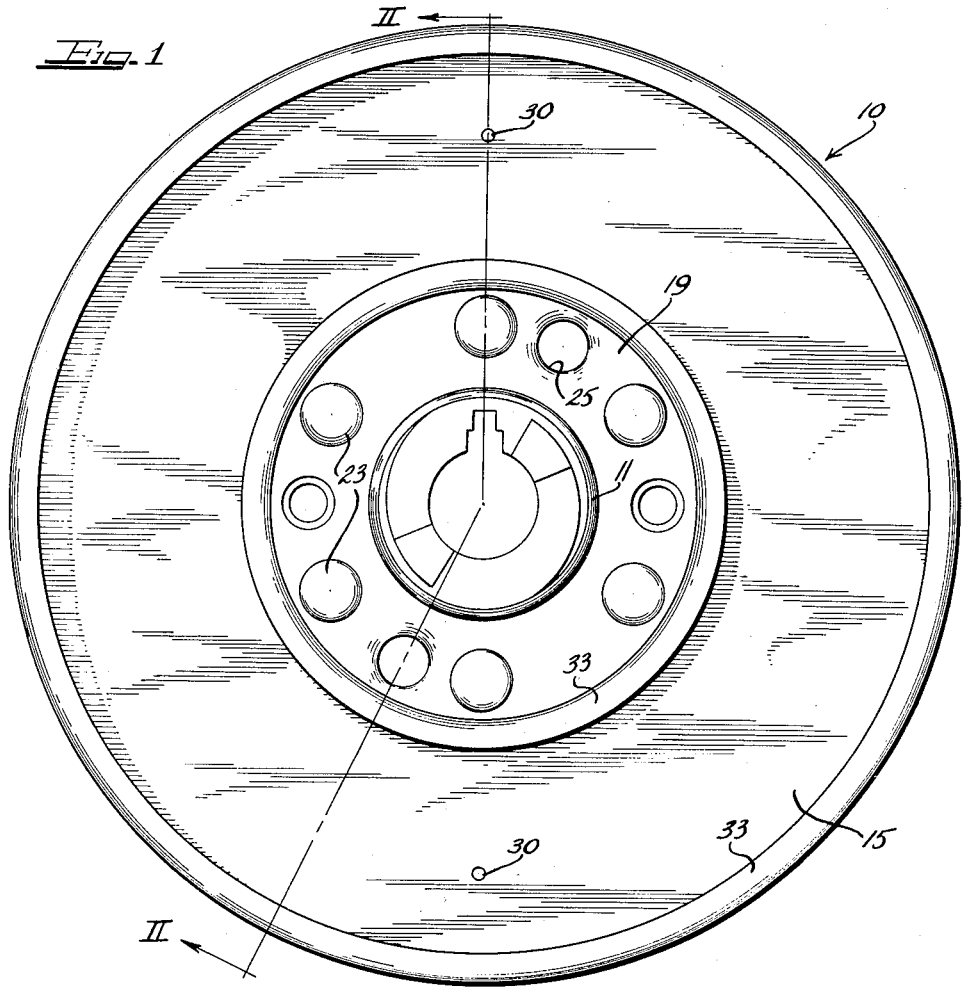
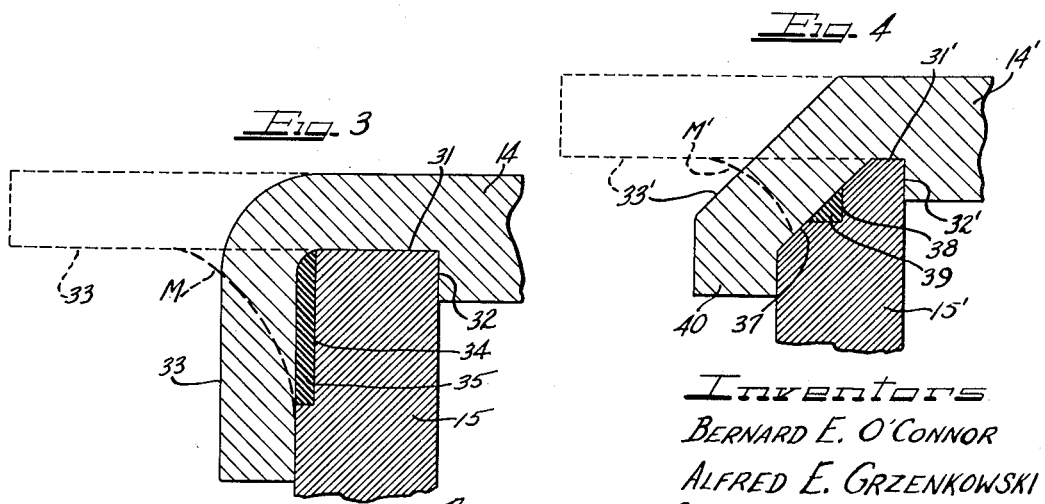
Inventors
BERNARD E. O'CONNOR
ALFRED E. GRZENKOWSKI

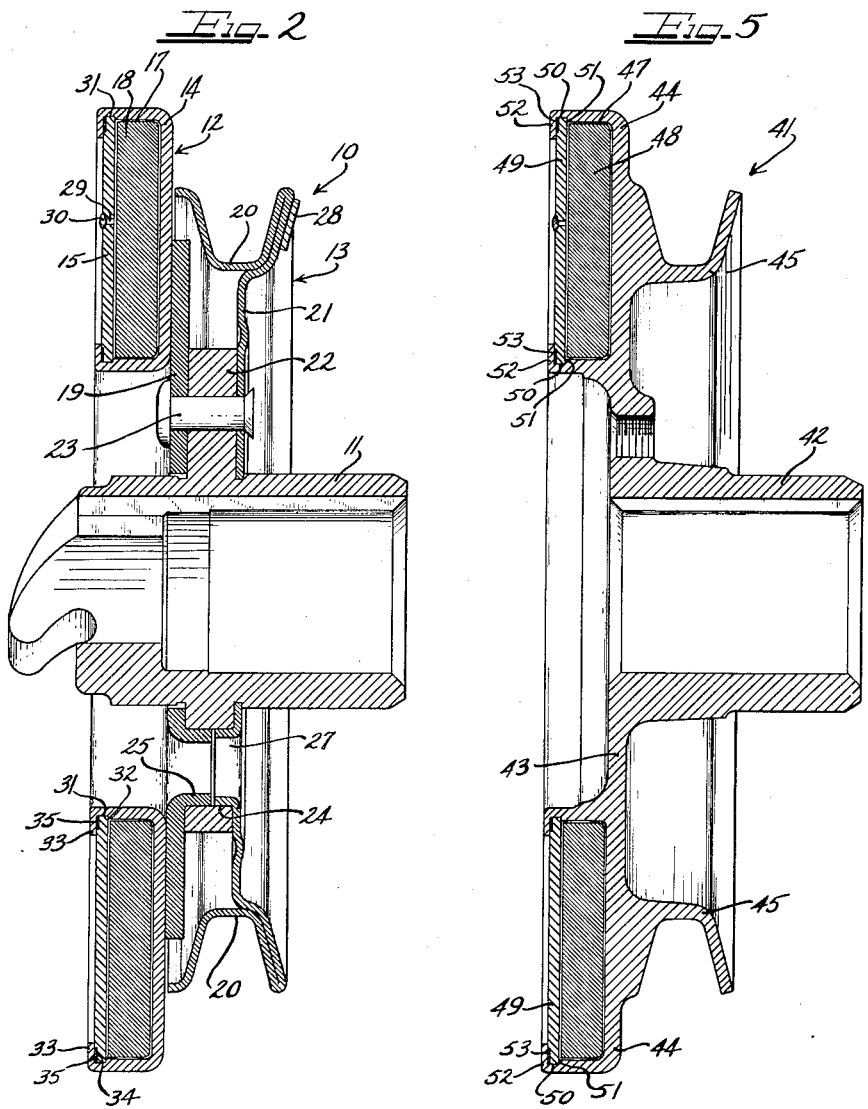

United States Patent Office 2,724,893
Patented Nov. 29, 1955

2,724,893

METHOD OF SEALING THE JOINT BETWEEN A COVER AND A TURNED OVER CASING WALL FLANGE

Bernard E. O'Connor, Buffalo, and Alfred E. Grzenkowski, Niagara Falls, N. Y., assignors to Houdaille-Hershey Corporation, Detroit, Mich., a corporation of Michigan Application June 3, 1949, Serial No. 97,052

6 Claims. (Cl. 29—511)

This invention relates to improvements in the sealing of the joints between the covers and the turned over casing wall flanges of members such as viscous torsional crankshaft dampers wherein a viscous fluid provides a coupling between a casing and an inertia member, and more particularly concerns improvements in sealing such dampers against escape of the viscous damping fluid.

An important object of the invention is to provide improvements in methods of sealing viscous torsional crankshaft dampers of the kind that are adapted to be utilized to damp the torsional vibrations in the crankshafts of internal combustion engines or the like.

A further object of the invention is to provide improvements in viscous torsional vibration dampers involving simplicity of assembly and effective sealing of the damper units against leakage of viscous damping fluid from the damper chamber.

Still another object of the invention is to provide an improved method of sealing a fluid containing unit such as a viscous torsional vibration damper against leakage of fluid therefrom.

Other objects, features and advantages of the present invention will be readily apparent from the following detailed description of certain preferred embodiments thereof taken in conjunction with the accompanying drawings, in which Figure 1 is a face elevational view of a torsional crankshaft damper according to the present invention;

Figure 2 is a transverse sectional detail view taken substantially on the line II—II of Figure 1;

Figure 3 is an enlarged fragmentary corner sectional detail view of the juncture between the damper housing and cover for the housing, taken in substantially the same plane as Figure 2 and showing in enlarged detail the structure of the fluid sealing joint and means for permanently securing the closure plate in place between the cover and the housing;

Figure 4 is a sectional detail view similar to Figure 3 but showing a modification; and Figure 5 is a transverse sectional detail view of a modified form of viscous torsional vibration damper further exemplifying the invention.

In one embodiment of the invention as shown in Figures 1, 2 and 3, a combination crankshaft damper and fan belt pulley unit 10 of the type which is adapted for use on the forward extremity of the crankshaft of an internal combustion engine includes a hub 11, a damper structure 12 and a pulley structure 13. The hub 11 is preferably of tubular construction so that it can be mounted upon the crankshaft extremity and keyed and secured thereto in appropriate fashion.

Both the damper structure 12 and the pulley structure 13 are adapted to be made in large measure from sheet metal. To this end, the damper assembly 12 comprises an annular side opening channel-shaped sheet metal casing member 14 and a sheet metal cover disk annulus 15 cooperating to define therein an anular chamber 17 housing an inertia member 18. The inside diameter of the casing annulus 14 is larger than the outside diameter of the hub 11 and the back of the housing casing 14 is secured to an attachment flange ring disk the inner margin of which is exposed through the central opening in the casing annulus.

The pulley member 13 is formed up from sheet metal in one piece to provide a pulley groove 20 and an integral generally radial attachment flange 21 extending inwardly from the trough wall of the pulley portion 20.

Assembly of the damper structure 12 and the pulley structure 13 with the hub 11 is effected by securing the respective attachment flanges 19 and 21 to opposite sides of a radial attachment flange 22 on the hub member 11. For this purpose the flanges 19, 21 and 22 are appropriately apertured in registration at appropriate points to accommodate rivets 23 by which the flanges are secured fixedly together, the flanges 19 and 21 being secured to respectively opposite sides of the hub flange 22. As best seen in Figure 1, there may be a plurality of the securing rivets 23 disposed at appropriate spaced intervals in a circle about the hub.

In order to facilitate registration of the several flanges and also to afford means for relieving the rivets 23 from torsional shear stresses, the hub flange 22 is formed with one or more additional apertures 24 therethrough and into which fit respective inturned boss-like intergral flanges 25 and 27 on the attachment flanges 19 and 21, respectively.

After the assembly is completed any unbalance that may be present can be overcome by attaching a counterbalance slug 28 to the pulley member 13 at a proper selected point.

The function of the damper structure 12 is to resist torsional oscillatory or vibrational movements of the shaft (not shown) with which the unit 10 may be used. For this purpose the inertia ring member 18 is externally dimensioned to have the surfaces thereof and more especially the axially facing and outer peripheral surfaces in parallel closely spaced relation to the opposing surfaces of the casing annulus 14 and the cover 15 and a viscous fluid fills or substantially fills the chamber 17 within the close spaces between the inertia member and the enclosing casing. The viscous fluid is introduced into the chamber 17, after assembly of the casing 14 and the cover 15 has been completed, through one of a pair of apertures 29 in the cover 15 and thereafter the apertures 29 are sealed permanently in fluid-tight relation as by means of welds 30.

A viscous fluid that has been found quite satisfactory is a silicone of which a commercial example may be identified as Dow-Corning fluid type 200 having a viscosity rating of approximately 30,000 centistokes at 77° F. An important advantage of a silicone fluid of this type is that it varies very little either in volume or viscosity throughout wide temperature ranges. The spacing between the working surfaces of the housing and the inertia member 18 is so proportioned to the viscosity of the fluid that the fluid is present as merely a shear film in such spacing during operation of the device. The spacing is, therefore, appropriately referred to as a shear film spacing. The spacing is greater than a mere lubricating film spacing but less than a spacing wherein there is but a mere fluid drag relationship.

Stated another way, the spacing between the working surfaces is so close that when there is any tendency toward rapid relative parallel movement of the opposing surfaces the layer of fluid adhering to one of the surfaces strongly resists relative movement or flow of the fluid adhering to the opposing surface and the layers of fluid are so close together that there is a substantially shearing relation of the fluid which absorbs the energy of relative movement of the surfaces and thus tends to restrain such relative movement.

Hence, while the unit 10 is rotating at constant speed, the viscous shear film coupling afforded by the viscous fluid between the housing and the inertia member or flywheel of the damper assembly 12 causes the inertia member to rotate with the assembly. In the presence of vibrational oscillations which cause momentary or periodic overrunning and/or underrunning of the crankshaft with respect to a mean velocity or momentum at any given time, similar vibrational oscillation of the damper housing casing 14 tends to occur, but the inertia member 18 resists variation from the mean momentum and due to the viscous shear film coupling damps the torsional vibrations and avoids the development of any vibrational harmonics in the shaft.

The problem of fluid leakage from the chamber 17 through the joints between the cover 15 and the casing shell 14 has been overcome by the present invention in a simple and efficient manner while permitting the components to be united by simple spinning process. Accordingly, having special reference to Figures 2 and 3, the opposite parallel walls of the casing shell 14 are formed on their distal marginal inner sides with respective rabbet grooves 31 which provide outwardly facing narrow shoulders 32 against which the respective margins of the cover plate 15 rest in assembly. The diameters of the grooves 31 are correlated to one another and to the diameter of the cover plate 15 to receive the edges of the plate freely in assembly. Prior to securing the components permanently together, the walls of the casing shell 14 defining the outer sides of the grooves 31 extend cylindrically outwardly to provide lips or flanges 33 which are longer than the thickness of the cover plate 15.

Respective rabbet grooves 34 are formed in the outwardly facing margins of the cover plate 15 to receive a sealing compound 35. This sealing compound is preferably a rubber-like thick fluid adhesive material which is applied through a nozzle into the corners between the outer marginal faces of the cover plate 15 and within the rabbet grooves 34 and the adjacent walls of the retaining flanges 33, an excess of the material being applied substantially fillet-like as indicated by the dash line M. The sealing compound is allowed to set or dry, and thereafter the retaining flanges 33 are spun over from the dash line position as shown on Figure 3 to the full line position and a body of the sealing material 35 trapped in the rabbet groove 34 while the excess material is squeezed out from between the spun over retaining flange 33 and the opposing surface of the plate 15 inwardly from the rabbet groove 34, and cleaned away.

By preference the spinning over of the flange 33 is carried to the point where metal-to-metal contact is effected between the marginal extremity of the retaining flange and the opposing surface of the cover plate 15 inwardly from the rabbet groove 34. As a result, assembly and sealing of the unit is effected quite economically and the fluid seal is thoroughly effective because by reason of the excess of sealing material initially applied, and bonding thereof to the surfaces within the groove 34 and the opposing retaining flange lip 33, there is complete assurance of thorough sealing of the joint; and the sealing material which is trapped within the rabbet groove 34 in each instance is held under compression or at least sealing pressure.

For certain purposes the modified joint structure of Figure 4 is preferred. In this construction a casing wall 14' has a marginal rabbet groove 31' providing a shoulder 22' receptive of the margin of a cover plate 15', the outer side of the groove being defined by a retaining flange or lip 33' which is initially cylindrical, as shown in dash outline. The outer corner of the closure plate margin is formed with a chamfer 37 which in turn is formed with a groove 38 providing a channel for a supply of sealing compound 39.

In effecting assembly of the cover plate 15' with the casing 14', the cover disk is placed with its margin against the shoulder 22' and a supply of sealing compound is applied within the generally V-shaped groove afforded between the chamfer 37 and the opposed wall of the flange 33', substantially as indicated in dash outline M'. After the sealing material has dried or set sufficiently, the flange 33' is spun over into tight, preferably metal-to-metal contact with the chamfer 37 and the terminal portion of the flange 33' is preferably further spun over to provide a terminal flange 40 overlapping the outer marginal face of the cover plate inwardly from the chamfer 37. As a result, a sealing body of the sealing compound is trapped within the groove 38 under pressure and a thorough fluid seal is effected.

In the modification of Figure 5 a combination crankshaft torsional vibration damper and pulley is shown in which the same principle of viscous torsional vibration damping is utilized as in the unit 10 but the major component of the unit comprises a one-piece casting made from malleable iron or other ductile material. To this end the unit 41 comprises a casting including a hub 42 arranged to be mounted on the extremity of a crankshaft and provided with a lateral flange 43 upon which is cast integrally a damper casing portion 44 and an appropriately channeled pulley flange 45, the latter being cast integrally with the back of the damper casing portion 44.

Within an annular housing channel groove 47 in the damper casing portion 44 is accommodated an inertia ring or flywheel 48. Closure for the inertia member chamber 47 is provided by a ring disk 49, the margins of which are secured to the damper casing portion 44 by engagement within marginal rabbet grooves 50 in the annular walls defining the chamber 47 providing outwardly facing shoulders 51 to receive the cover margins and against which the cover is held by means of turned over marginal retaining lip flanges 52. Fluid sealing means 53 is provided at the joints between the cover 49 and the casing walls 44 in similar fashion as described in connection with the unit 10 and which although shown as substantially the same as more clearly shown in Figure 3, may nevertheless be in the form shown in Figure 4, as an alternative if desired. In fact, with certain lower grades of malleable iron the form of the joint shown in Figure 4 is preferred because less severe spinning is required in turning over the clenching or retaining lip flanges than the substantially right angular bend as disclosed in Figures 3 and 5.

We claim as our invention:

1. A method of securing a cover plate in fluid tight relation to the wall of a casing, which comprises effecting preliminary assembly of the cover plate with the wall by resting the cover plate marginally against a shoulder disposed on the casing wall spaced from the edge of the wall a distance greater than the thickness of the cover plate, thereafter applying a sealing material in plastic condition to the corner defined between the cover margin and the outwardly projecting wall flange, and turning over the wall flange into retaining relation to the margin of the cover plate and by such turning over of the flange onto the sealing material placing the sealing material under pressure between the turned over flange and the cover plate margin.

2. The method of assembling a cover plate margin, formed with a groove opening generally toward one face of the cover margin, with an internal shoulder of a casing wall including a retaining flange initially projecting outwardly to a greater extent than the thickness of the cover plate margin, which comprises setting the cover plate margin on said shoulder with said groove opening generally outwardly, applying a sealing material in plastic state into said groove in excess of the volume of the groove, and turning over said retaining flange onto said cover margin and into closing relation to said groove and by pressure of said flange squeezing the excess sealing material beyond said groove.

3. A method of assembling in fluid tight relation a margin of a cover member with a wall of a casing structure and wherein the cover margin has a generally outwardly opening annular groove therein and the casing wall has an internal shoulder against which the cover margin rests an sssembly and a retaining flange adapted to be turned over onto the cover margin to clamp the same against said shoulder, which comprises initially assembling the inner side of the cover margin on said shoulder, then flowing a flowable sealing material into the entire extent of said groove while the groove is fully exposed prior to turning the flange onto the cover margin, and thereafter turning said flange into tight face-to-face engagement with the cover margin in closing relation to said groove to trap the sealing material in the joint thus provided.

4. A method of providing a fluid sealed joint between a pair of members wherein one of the members has a shoulder and a flange adapted to be turned into clamping opposition to said shoulder and the other of the members has a margin adapted to rest on said flange and be clamped thereagainst by turning over of said flange thereagainst, which comprises preliminarily assembling the members by resting said margin against said shoulder, applying a substantially fillet-like mass of plastic sealing material in the corner between said margin and said flange, and turning said flange into face-to-face engagement adjacent its terminal against said margin and trapping a sealing quantity of the sealing material within the joint but squeezing excess sealing material from the joint as an incident to turning of, and by the pressure exerted by, the flange into clamping relation to said margin.

5. A method of sealing a joint between two members wherein one of the members has a shoulder and a bendable clamping flange initially projecting normal to said shoulder and the other member has a margin adapted to rest against said shoulder and be clamped thereagainst by turning over of said flange, said margin having a groove facing toward one side thereof, which comprises resting the opposite side of said margin against said shoulder with the groove facing generally away from the shoulder, while the groove is fully exposed and prior to turning over of the flange filling said groove with an excess of settable plastic sealing material in thick fluid condition, allowing the sealing material to set, and after the sealing material has substantially set turning said flange over by bending said flange into clamping relation to said margin and into closing relation to said groove, and as an incident to said bending and clamping employing the flange itself for squeezing excess sealing material clear of the joint and by the pressure of the flange thereagainst as an incident to the turning over thereof placing the sealing material in the groove under pressure.

6. The method of assembling a torsional vibration damper which comprises placing a circular inertia member within a circular casing defining a chamber for the inertia member and wherein the casing has an annual wall including a rabbet groove margin defining an outwardly facing annular shoulder and a bendable annular retaining flange projecting outwardly beyond said shoulder, applying a circular cover disk having a margin thinner than the length of said flange into closing relation to the chamber with the disk margin resting against said shoulder, applying through a nozzle an exces fillet-like annular mass of thick fluid, settable sealing material into bonding relation spanning entirely across the outer face of said disk margin and the adjacent face of the flange and the joint therebetween, setting the sealing material into joint sealing bonded relation to said disk margin and said face of the flange, and bending said flange into clamping relation to the cover disk margin and into pressing relation to said sealing material and by said pressing relation of the flange to said margin squeezing the excess sealing material from between the cover disk margin and the flange to the outer side of the cover disk for cleaning away.

References Cited in the file of this patent

UNITED STATES PATENTS

| Number | Name | Date |
|---|---|---|
| 745,261 | Stubinger | Nov. 24, 1903 |
| 1,522,630 | Ireland | Jan. 13, 1925 |
| 1,661,325 | Derrick | Mar. 6, 1928 |
| 1,839,578 | Morton | Jan. 5, 1932 |
| 1,880,030 | Wilson | Sept. 27, 1932 |
| 2,266,702 | Byers | Dec. 16, 1941 |
| 2,287,197 | Sandberg | June 23, 1942 |
| 2,331,449 | Wittenberg | Oct. 12, 1943 |
| 2,382,378 | Bloedorn | Aug. 14, 1945 |
| 2,402,253 | Macleod | June 18, 1946 |
| 2,403,478 | Burnat | July 9, 1946 |
| 2,416,693 | Hills | Mar. 4, 1947 |
| 2,448,266 | Kaser | Aug. 31, 1948 |
| 2,454,980 | Sobell | Nov. 30, 1948 |
| 2,565,313 | Lauck | Aug. 21, 1951 |
| 2,574,625 | Coss | Nov. 13, 1951 |

FOREIGN PATENTS

| Number | Country | Date |
|---|---|---|
| 507,616 | Great Britain | June 19, 1939 |